United States Patent [19]
Mamyshev et al.

[11] Patent Number: 6,141,090
[45] Date of Patent: Oct. 31, 2000

[54] FIBER OPTIC CABLE HAVING A SPECIFIED PATH AVERAGE DISPERSION

[75] Inventors: Pavel V. Mamyshev, Middletown; Linn Frederick Mollenauer, Colts Neck, both of N.J.

[73] Assignee: Lucent Technologies Inc., Murray Hill, N.J.

[21] Appl. No.: 09/365,572

[22] Filed: Aug. 2, 1999

Related U.S. Application Data

[62] Division of application No. 08/871,160, Jun. 9, 1997, Pat. No. 6,011,615.

[51] Int. Cl.$^7$ .................................................. G01N 21/00
[52] U.S. Cl. ........................................................... 356/73.1
[58] Field of Search ........................................... 356/73.1

[56] References Cited

U.S. PATENT DOCUMENTS 5,778,128  7/1998  Wildeman ................................ 385/123
6,011,615  1/2000  Mamyshev et al. .................... 356/73.1

*Primary Examiner*—Frank G. Font
*Assistant Examiner*—Reginald Ratiff

[57] ABSTRACT

Fiber optic cable waste is avoided by measuring amplitude oscillations of four-wave mixing products in positive-dispersion and negative-dispersion fiber optic cable to determine the lengths of a first, positive-dispersion cable segment and a second, negative-dispersion cable segment that are used to provide a specified length of fiber optic cable having a specified amount of path-average chromatic dispersion. The integrated dispersion of a positive-dispersion fiber optic cable as a function of length is measured to provide a first set of data, and the integrated dispersion of a negative-dispersion fiber optic cable as a function of length is measured to provide a second set of data. A fiber-optic cable is simultaneously fed with two optical signals, a first at wavelength $\lambda_1$ and a second at wavelength $\lambda_2$, and the number of sinusoidal oscillations that occur in the four-wave mixing products of the Stokes (or anti-Stokes) sideband as a function of cable length are measured. The second set of data is reflected about a line representing zero length, linearly translated by the specified length along a length axis, and then linearly translated by the specified dispersion along an integrated dispersion axis to provide a transformed second set of data. A point of intersection of the first set of data with the transformed second set of data is calculated. A length coordinate of this point of intersection represents the length of the first cable segment. A length for the second cable segment is calculated by subtracting the length of the first cable segment from the specified length.

7 Claims, 4 Drawing Sheets

FIBER OPTIC CABLE HAVING A SPECIFIED PATH AVERAGE DISPERSION

This application is a division of application Ser. No. 08/871,160 filed Jun. 9, 1997, now U.S. Pat. No. 6,011,615.

BACKGROUND

1. Field of the Invention

This invention is related to fiber optic cable, and more specifically to techniques for providing a fiber optic cable having a desired amount of path-average dispersion.

2. Background Art

In the art of fiber optic communications, there is presently a considerable demand for providing a length of fiber optic cable having a specified amount of path-average dispersion. Such a cable may be fabricated using fiber spans containing alternating segments of positive and negative chromatic dispersion, represented by the symbol D. The instantaneous, or local, value of D at one end of the cable, denoted as $D_{loc}$, is selected to be just large enough to effectively thwart the four-wave mixing products of optical signals. Typical values of $D_{loc}$ are in the range of around 2 to 4 picoseconds per nanometer-kilometer. However, the exact value of $D_{loc}$ is not especially critical, as it is more important that the path-average dispersion for the fiber span conform to a certain desired value, typically much less than $D_{loc}$. The path-average dispersion of a fiber span of length L may be mathematically denoted as:

$$\overline{D} = \frac{1}{L}\int_0^L D(z')dz'$$

For applications involving the transmission of non-return-to-zero (NRZ) data, the desired $\overline{D}$ is zero, while, for soliton data transmission, the desired $\overline{D}$ is in the range of about 0.05 to 0.5 picoseconds per nanometer-kilometer.

Using state-of-the-art technology, the fabrication of a fiber optic cable length having a desired amount of path-average dispersion is an arduous task. The chromatic dispersion of a first, negative-dispersion spool of fiber optic cable is measured, and the dispersion of a second, positive-dispersion spool is measured. Based upon the total desired length of the fiber optic cable to be manufactured, and the desired path-average dispersion of this cable, the amount of cable to be cut from the first spool is determined, as is the amount of cable to be cut from the second spool. The section of cable cut from the first spool is joined to the section of cable cut from the second spool, theoretically providing a desired length of cable that has a desired amount of dispersion.

SUMMARY OF THE INVENTION

The invention is based upon a recognition that a typical spool of fiber optic cable exhibits substantial inhomogeneities in dispersion as a function of cable length, D(z). In a given spool of cable, we have observed that D(z) exhibits random variations of as much as ±1 picosecond per nanometer-kilometer or more. Thus, the $\overline{D}$ of a cable segment cut from a spool of cable is not accurately predicted by, and is often dramatically different from, the $\overline{D}$ of the entire spool. Accordingly, after a cable length has been fabricated using existing procedures, the cable oftentimes does not provide the desired amount of dispersion. The procedure must typically be repeated a number of times until a cable length having the desired dispersion is provided. Expensive trial and error is involved, and much fiber is wasted.

According to a feature of the invention, the waste of fiber optic cable is avoided by measuring amplitude oscillations of four-wave mixing products in positive-dispersion and negative-dispersion fiber optic cable to determine the lengths of a first, positive-dispersion cable segment and a second, negative-dispersion cable segment that are used to provide a specified length of fiber optic cable ($L_S$) having a specified amount of path-average chromatic dispersion ($D_S$). More specifically, the integrated dispersion of a positive-dispersion fiber optic cable as a function of length is measured to provide a first set of data, and the integrated dispersion of a negative-dispersion fiber optic cable as a function of length is measured to provide a second set of data. Integrated dispersion is measured by simultaneously feeding a fiber-optic cable with optical signals from a first source of electromagnetic energy at wavelength $\lambda_1$ and optical signals from a second source of electromagnetic energy at wavelength $\lambda_2$, and then counting the number of sinusoidal oscillations that occur in the amplitude of the four-wave mixing products of either the Stokes or anti-Stokes sideband as a function of cable length. The second set of data is reflected about a line representing zero length, linearly translated by length $L_S$ along an axis representing length, and then linearly translated by dispersion $D_S$ along an axis representing integrated dispersion to provide a transformed second set of data. A point of intersection of the first set of data with the transformed second set of data is calculated. A length coordinate of this point of intersection represents the length of the first cable segment. A length for the second cable segment is calculated by subtracting the length of the first cable segment from $L_S$. Pursuant to a further embodiment, the first cable segment is cut into a first section and a second section, and the second cable segment is placed between the first and second sections. The length of the first and second sections of the first cable segment is determined so as to minimize the accumulated phase shift of the four-wave mixing products over the specifiedlength of cable.

DETAILED DESCRIPTION OF THE PREFERRED EMBODIMENTS

Figure 1:
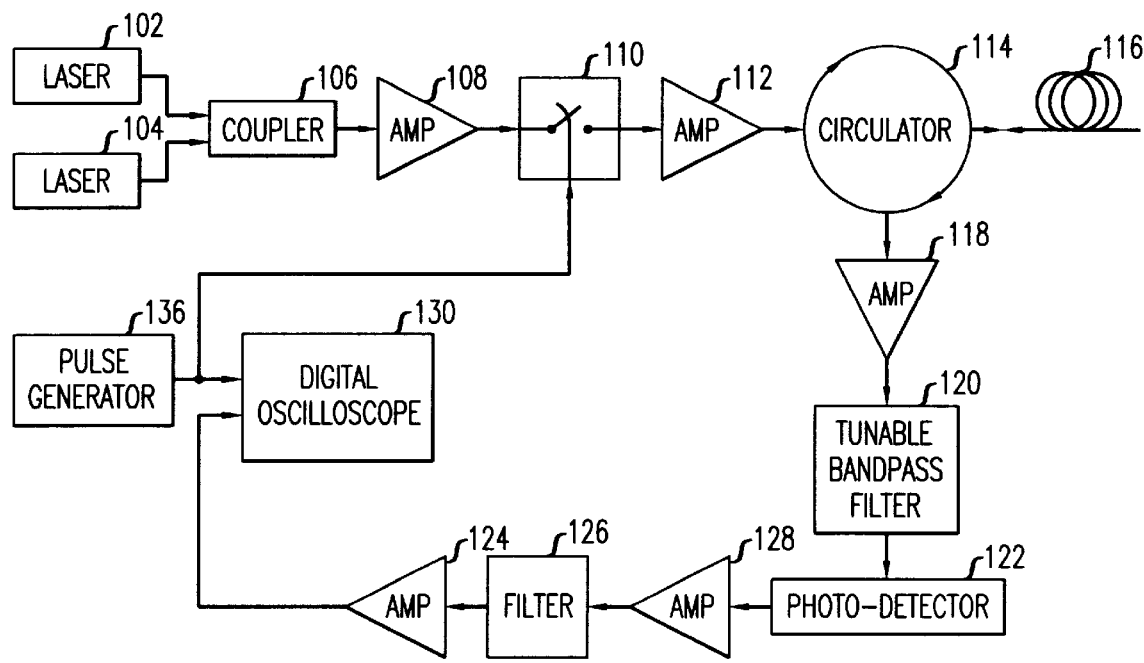
FIG. 1 is a hardware block diagram of an apparatus which is used to measure integrated chromatic dispersion of fiber optic cables constructed in accordance with the techniques disclosed herein.

There is presently a considerable demand for fiber optic cable spans that contain alternating segments of positive and negative chromatic dispersion, D. Such spans are used for non-return-to-zero (NRZ) data transmission, for soliton transmission, and/or for equalizing the dispersion of a specified length of fiber optic cable. Although the "instantaneous" or local value of D at one end of the cable, denoted as $D_{loc}$ is selected to be of sufficient magnitude so as to effectively prevent cumulative growth of four-wave mixing products, the exact value of $D_{loc}$ chosen for a given design is not extremely critical. Typical values for $D_{loc}$ are in the range of 2 to 4 picoseconds per nanometer-kilometer. However, for many system applications, it is more important that the path-average dispersion of a cable span accurately conform to a specified value, which is typically much less than $D_{loc}$.

The path-average dispersion for a span of fiber optic cable having a length L is defined mathematically as $$\overline{D} = \frac{1}{L}\int_0^L D(z')dz'$$

For NRZ data transmission, it is generally desired to provide a path-average dispersion ($\overline{D}$) which is substantially equal to zero. On the other hand, for soliton data transmission, it is desired to provide a $\overline{D}$ of about 0.05 to 0.5 picoseconds per nanometer-kilometer.

It is often an arduous task to fabricate a span of fiber optic cable having a specified amount of path-average dispersion. For example, one presently-existing fabrication method measures the chromatic dispersion of each of a plurality of spools of fiber optic cable. Dispersion is not measured as a function of distance but, rather, the net dispersion of the entire length of cable on each spool is measured. A first cable segment from a first spool is coupled to a second cable segment from a second spool. The first spool contains cable having positive chromatic dispersion, and the second spool contains cable having negative chromatic dispersion. In this manner, it seems that it should be a relatively straightforward matter to provide a fiber optic cable span having a specified amount of dispersion. Cable fabrication personnel need only select cable spools having appropriate amounts of negative and positive dispersion to construct a fiber optic cable span having a specified amount of dispersion.

Unfortunately, fabricating such a cable span is not so simple. Naturally-occurring inhomogeneities within each spool of fiber optic cable cause the instantaneous dispersion D(z) of the cable at particular points along the cable to vary by as much as plus and minus 1 picoseconds per nanometer-kilometer or more. Therefore, $\overline{D}$ of a segment of cable removed from a spool is not accurately predicted by the net dispersion of the entire cable spool. Rather, the $\overline{D}$ of a cable segment may differ dramatically from the $\overline{D}$ of the spool from which the segment is taken. Thus, the fabrication of a cable span having a specified $\overline{D}$ requires much trial and error. A cable segment is removed from the first spool and coupled to a cable segment which has been removed from a second spool. The dispersion of the resulting cable span is measured, and the process is repeated as many times as necessary until the measured dispersion is sufficiently close to the desired dispersion. In the process, much cable is wasted.

The novel methods of fabricating a specified length of fiber optic cable ($L_S$) having a specified amount of chromatic dispersion ($D_S$) disclosed herein avoid wasting fiber optic cable. The specified length is fabricated from a first cable segment having positive dispersion and a second cable segment having negative dispersion. A novel dispersion mapping procedure using, for example, the apparatus of FIG. 1, determines the dispersion of a first fiber optic cable and a second fiber optic cable as a function of distance. For purposes of illustration, the first fiber optic cable may provide positive dispersion, and the second fiber optic cable may provide negative dispersion.

Figure 3:
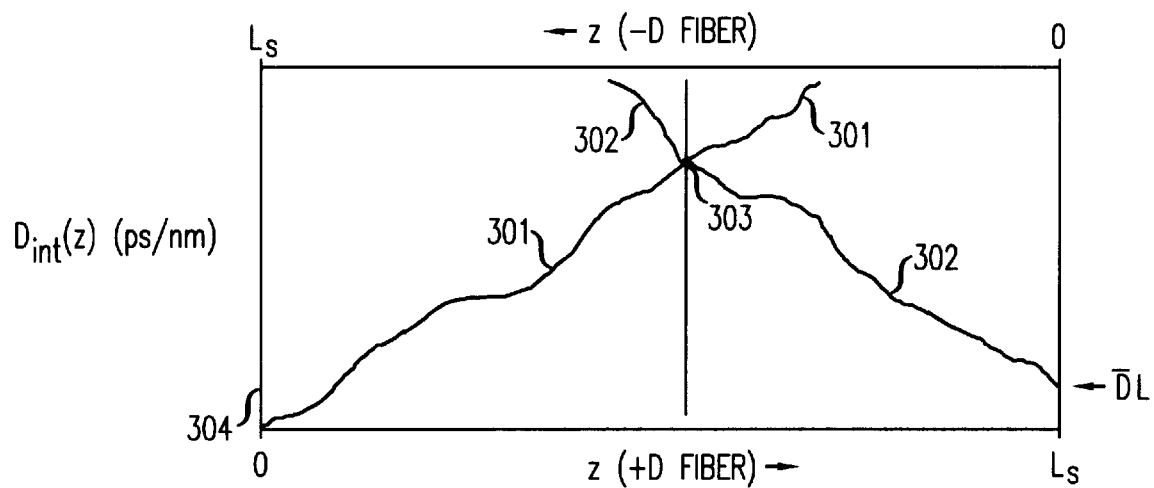
FIG. 3 is a graph showing integrated dispersion versus cable length for first and second segments of fiber optic cable which are used to fabricate a specified length of cable having a specified amount of path-average dispersion.

The dispersion of the positive-dispersion fiber optic cable as a function of length is integrated and plotted as a first graph, and the dispersion of the negative-dispersion fiber optic cable as a function of length is integrated and plotted as a second graph. The second graph is reflected about a line representing zero length, linearly translated by length $L_S$ along the length axis, and then linearly translated by dispersion $D_S$ along the dispersion axis to provide a transformed second graph. The first graph, as well as the transformed second graph, are shown in FIG. 3, to be described in greater detail hereinafter. The point of intersection of the first graph with the transformed second graph is calculated. The length coordinate of this point of intersection represents the length of the first cable segment. The length of the second cable segment is calculated by subtracting the length of the first cable segment from $L_S$.

The apparatus of FIG. 1 measures dispersion using operational principles based upon optical time domain reflectometer (OTDR) four-wave mixing processes. These dispersion measurements take the form of fiber-optic D maps which are described in various references including an article entitled, "Method for Facile and Accurate Measurement of Optical Fiber Dispersion Maps", by L. F. Mollenauer, P. V. Mamyshev, and M. J. Neubelt, published in Optical Letters, vol. 21, page 1724 et seq., 1996.

Refer now to FIG. 1, which shows an illustrative apparatus for measuring the dispersion of a fiber optic cable as a function of distance. Note that various other hardware configurations could alternatively be employed to measure the dispersion of fiber optic cable over distance, and the configuration of FIG. 1 merely represents an illustrative example. A first laser 102 generates optical energy at a first wavelength $\lambda_1$, and a second laser 104 generates optical energy at a second wavelength $\lambda_2$, where $\lambda_1$ is greater than $\lambda_2$. The outputs of the first and second lasers 102, 104 are combined by optical coupler 106 and amplified by optical amplifier 108. The output of optical amplifier 108 is fed to a first port of an optical switch 110. A second port of optical switch 110 is coupled to the input of optical amplifier 112. Optical switch 110 includes a control terminal which, when activated, causes the first and second ports to be coupled together. When the control terminal is not activated, the first and second ports are not coupled together. The output of a pulse generator 136 is connected to the control terminal of optical switch 110. In this manner, the first and second ports are coupled for the duration of the pulse received from pulse generator 136.

The combination of optical switch 110 and pulse generator 136 serves to form pulses from the output of amplifier 108. The optical pulses typically have a duration less than one microsecond. Optical amplifier 110 amplifies these optical pulses to a peak power level of about 0.2 to 0.5 watts each, and the amplified optical pulses are then fed to a first port of a circulator 114. A second port of circulator 114 is coupled to a segment of fiber optic cable 116 that is currently under test, and a third port of circulator 114 is coupled to optical amplifier 118.

Circulator 114 may be conceptualized as an optical passive waveguide junction of three or more ports, in which the ports can be listed in such an order that when power is fed into any port it is transferred to the next port on the list, the first port being counted as following the last port in order. In the present example, the first port of circulator 114 functions as an input port to which incident optical energy is applied (in the form of optical pulses). The second port feeds this optical energy into fiber optic cable 116. Any optical energy back-scattered by fiber optic cable 116 is fed into the second port of circulator 114, and the circulator transfers this back-scattered optical energy to the third port.

As the amplified optical pulses propagate down fiber optic cable 116, these pulses generate Stokes and anti-Stokes sidebands via well-known four-wave mixing processes. Briefly, two photons of light at wavelength $\lambda_1$ combine with one photon of light at wavelength $\lambda_2$ to generate a Stokes sideband, whereas two photons of light at wavelength $\lambda_2$ combine with one photon of light at wavelength $\lambda_1$ to generate an anti-Stokes sideband. The anti-Stokes sideband occurs at a wavelength given by $\lambda_2-(\lambda_1-\lambda_2)$, whereas the Stokes sideband occurs at a wavelength given by $\lambda_1+(\lambda_1-\lambda_2)$.

The intensity of the Stokes and anti-Stokes sidebands does not remain constant over the entire length of fiber optic cable 116. Rather, as the optical pulses of wavelength $\lambda_1$ and $\lambda_2$ travel down the cable, the intensity of the Stokes and anti-Stokes sidebands varies sinusoidally as a function of distance from an end of the cable. The reference end of the cable could, but need not, be the end of fiber optic cable 116 that is coupled to circulator 114. The instantaneous frequency of these sinusoidal oscillations at a given distance from the end of the cable is directly proportional to the local dispersion D(z) of the cable at that given distance. For the Stokes (lower frequency) sideband, the frequency of these sinusoidal oscillations as a function of distance is given by:

$$F_S = c(\delta\lambda/\lambda)^2 D(\lambda_1)$$

while, for the anti-Stokes (higher frequency) sideband, the frequency of these sinusoidal oscillations is given by:

$$F_A = c(\delta\lambda/\lambda)^2 D(\lambda_2)$$

where $\delta\lambda = \lambda_1 - \lambda_2$, and where c is the speed of light. Note that measuring $F_S(z)$ effectively measures $D(\lambda_1, z)$, whereas measuring $F_A(z)$ effectively measures $D(\lambda_2, z)$. The sinusoidal oscillations are actually observed in the form of Rayleigh backscattering at the reference end of fiber optic cable 116 (i.e., the end coupled to circulator 114). At the reference end of the fiber optic cable 116, the sinusoidal oscillations fluctuate in intensity as a function of time. The frequency of these intensity fluctuations is mathematically given by the expression $$f(t) = \frac{c}{2n} F(z)$$

where n is the effective index of refraction of fiber optic cable 116, and where t is the round-trip propagation delay from the fiber input to point z and back. The optical energy propagating from the second port of circulator 114 into optical fiber 116, and then back into the second port of circulator 114, is referred to as back-scattered optical energy. Various characteristics of this back-scattered optical energy are related to the dispersion of fiber optic cable 116, as will be described in greater detail hereinafter.

As shown in FIG. 1, the circulator 114 directs the back-scattered optical energy from the second port of the circulator to the third port of the circulator, where the back-scattered optical energy is amplified by an optical amplifier 118. A tunable bandpass filter 120 is tuned to pass a frequency band including either the Stokes sideband or the anti-Stokes sideband. The output of tunable bandpass filter 120 is fed to a photodetector 122 which generates an electrical signal related to the magnitude of optical energy incident thereupon. The output of photodetector 122 is fed to an amplifier 124 which amplifies the electrical signal produced by photodetector 122, and the amplified electrical signal is filtered by filter 126, which may, but need not, be a low-pass filter. The output of filter 126 is coupled to amplifier 128, and amplifier 128 is used to drive the input of a digital oscilloscope 130. Digital oscilloscope 130, triggered by pulse generator 136, is equipped to digitally store signal waveforms received from the output of amplifier 128.

Figure 2:
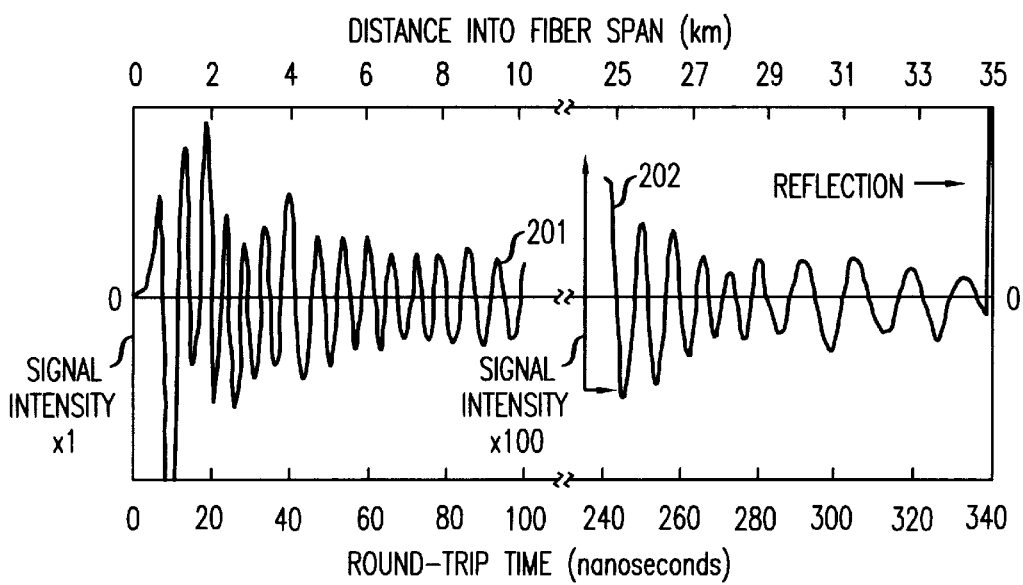
FIG. 2 is a graph showing relative amplitude of four-wave mixing products versus distance for an illustrative segment of fiber optic cable.

FIG. 2 is a graph showing relative amplitude of four-wave mixing products versus distance for an illustrative segment of fiber optic cable. This graph is prepared from the waveforms recorded by digital oscilloscope 130 (FIG. 1). The y-axis of FIG. 2 represents the relative signal intensity at the output of amplifier 128 (FIG. 1), and the x-axis (FIG. 2) may be conceptualized as representing the round-trip propagation delay through the fiber optic cable 116 and/or the distance into fiber optic cable 116 as measured from the point where fiber optic cable 116 is coupled to circulator 114 (FIG. 1). The first waveform 201 of FIG. 2 shows the relative amplitude of four-wave mixing products for distances into the fiber optic cable 116 in the range of zero to ten kilometers, which corresponds to a round-trip propagation delay of about 100 nanoseconds. The second waveform 202 of FIG. 2 shows the relative amplitude of four-wave mixing products for distances in the range of 25 to 35 kilometers, corresponding to round-trip propagation delays of about 240 to 340 nanoseconds. Note that the y-axis for the second waveform 202 has been scaled by a factor of 100 so as to permit observation of signal fluctuations which are of a relatively minor magnitude compared to those of first waveform 201.

FIG. 3 is a graph showing integrated dispersion versus distance for first and second segments of fiber optic cable which are used to fabricate a specified length of cable having a specified amount of path-average dispersion. In this manner, a specified length of fiber optic cable ($L_S$) having a specified amount of chromatic dispersion ($D_S$) is fabricated from a first cable segment having positive dispersion and a second cable segment having negative dispersion. The plot of FIG. 3 depicts a novel dispersion mapping procedure for determining the lengths of the first and second cable segments.

Referring now to FIG. 3, the integrated dispersion of a positive-dispersion fiber optic cable as a function of length is measured and plotted as a first graph 301, and the integrated dispersion of a negative-dispersion fiber optic cable as a function of length is measured and plotted as a second graph. The second graph is reflected about a line representing zero length 304, linearly translated by length $L_S$ along the length axis, and then linearly translated by dispersion $D_S$ along the integrated dispersion axis to provide a transformed second graph 302. The point of intersection 303 of the first graph with the transformed second graph is calculated. The length coordinate of this point of intersection represents the length of the first cable segment. The length of the second cable segment is calculated by subtracting the length of the first cable segment from $L_S$. The specified length of cable having a specified amount of dispersion is fabricated by coupling together the first and second cable segments using any of various techniques well known to those skilled in the art.

The apparatus of FIG. 1 may be employed to directly measure the integrated dispersion of fiber optic cable segments so as to permit construction of the graphs of FIG. 3.

As stated above, the frequency of the sinusoidal oscillations of the Stokes (lower-frequency) sideband as a function of distance into a cable segment, $F_S$, is equal to c $(\delta\lambda/\lambda)^2*D$ ($\lambda_1$), and the frequency of the sinusoidal oscillations of the anti-Stokes (higher-frequency) sideband as a function of distance into a cable segment, $F_A$, is equal to c $(\delta\lambda/\lambda)^2*D$ ($\lambda_2$). Integrating $F_S$ yields the expression $$\int_0^Z F_S(z')dz' = c(\delta\lambda/\lambda)^2 \int_0^Z D(z', \lambda_1)dz'$$

which may be conceptualized as representing the number of oscillations in the amplitude of the four-wave mixing products over a cable length from 0 to z, mathematically denoted as $N_S(z)$. Similarly, integrating $F_A$ yields the expression $$\int_0^Z F_A(z')dz' = c(\delta\lambda/\lambda)^2 \int_0^Z D(z', \lambda_2)dz'$$

which may be conceptualized as representing the number of oscillations in the amplitude of the four-wave mixing products over a cable length from 0 to z, mathematically denoted as $N_A(z)$.

Next, define integrated dispersion $D_{int}(z)$ as follows:

$$D_{int}(z) \equiv \int_0^Z D(z')dz'$$

Then, integrated dispersion as a function of z and $\lambda$ is given by the expression $$D_{int}(z, \lambda_1) = \frac{1}{c(\delta\lambda/\lambda)^2} * N_S(z)$$

if the tunable bandpass filter 120 of FIG. 1 is substantially tuned to the Stokes sideband. If the tunable bandpass filter is substantially tuned to the anti-Stokes sideband, integrated dispersion is given by the expression $$D_{int}(z, \lambda_2) = \frac{1}{c(\delta\lambda/\lambda)^2} * N_A(z)$$

The expressions $N_S(z)$ and $N_A(z)$ in the above two equations, respectively, permit a very straightforward calculation of integrated dispersion because $N_S(z)$ and $N_A(z)$ are quantities that are readily measured by the apparatus of FIG. 1. These quantities are measured by measuring the number of sinusoidal oscillations in the amplitude of the four-wave mixing products of either the Stokes or anti-Stokes sideband as a function of cable length. In practice, since $N_S(z)$ and $N_A(z)$ can generally be resolved to a small fraction of an oscillation, and since there are typically several oscillations per kilometer of cable length, the measurement of integrated dispersion is very well-resolved and relatively precise.

The absolute accuracy with which it is possible to measure the dispersion of fiber optic cable is related to the degree with which an accurate $\delta\lambda$ is maintained. Note that $\delta\lambda$ represents the wavelength difference between the first and second lasers 102, 104, respectively, shown in FIG. 1. However, an error in $\delta\lambda$ only affects the accuracy of the plotted values along the integrated dispersion axis (i.e., the y-axis) of FIG. 3. The fractional error in $D_S=(\overline{D})$ will be no greater than the fractional error in $(D_{int}(z))/L_S$, even though the latter quantity is typically many times the former. Thus, for example, when $\overline{D}=0$, only precision, but no absolute accuracy, is required in conducting the dispersion measurements. Nevertheless, it is also important to avoid any change in $\delta\lambda$ between the measurements of the positive-dispersion and negative-dispersion cable segments. One technique for avoiding any such changes is to use the same instruments for both measurements, and to make the measurements in fairly rapid sequence.

For many systems, it is convenient or otherwise desirable to specify an $L_S$ related to the amplification period of the amplified optical pulse, where the amplification period is denoted as $L_{amp}$. In this scenario, it is possible to attain a length of fiber optic cable having very desirable properties by using an enhanced version of the technique described in conjunction with FIG. 3. Accordingly, pursuant to a further embodiment, the first cable segment is cut into a first section and a second section, and the second cable segment is placed between the first and second sections. The length of the first and second sections of the first cable segment is determined so as to minimize the accumulated strength of the four-wave mixing products over the specified length of cable. In this manner, if the length of fiber optic cable is used to implement wavelength-division-multiplexed (WDM) transmission, the net four-wave mixing products generated by these transmissions will be substantially minimized. Such a length of fiber optic cable may be employed, for example, in the operational environment of FIG. 4.

Figure 4:
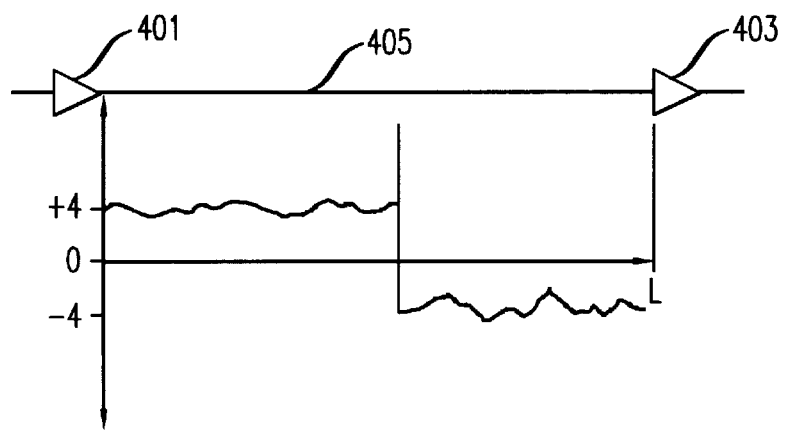
FIG. 4 is a diagrammatic representation showing an illustrative system application for a specified length of fiber optic cable having a specified amount of path-average dispersion.

Refer now to FIG. 4, which is a graph showing dispersion versus distance for a specified length $L_S$ of fiber optic cable 405 having a specified amount of path-average dispersion $D_S$ and used to couple a first optical amplifier 401 to a second optical amplifier 403. Fiber optic cable 405 is comprised of a first cable segment having a positive dispersion in the range of about +2 to +5 picoseconds per nanometer-kilometer, and a second cable segment having a negative dispersion in the range of about −2 to −5 picoseconds per nanometer. Amplifiers 401 and 403 may be conventional optical amplifiers such as, for example, erbium-doped fiber amplifiers (EDFAs). For purposes of the following mathematical analysis, it will be assumed that the positive-dispersion cable segment immediately follows amplifier 401, although it readily becomes apparent that the analysis is adaptable for the case where a negative-dispersion cable segment immediately follows amplifier 401, followed by a positive-dispersion cable segment.

The phase mismatch for four-wave mixing between two adjacent-frequency wavelength-division-multiplexed channels of wavelength separation ($\Delta\lambda$) may be mathematically denoted as:

$$\delta K = 2\pi c \left(\frac{\Delta\lambda}{\lambda}\right)^2 D(\lambda)$$

This equation may be employed to plot the phase mismatches of various combinations of first cable segment lengths and second cable segment lengths.

Figure 5:
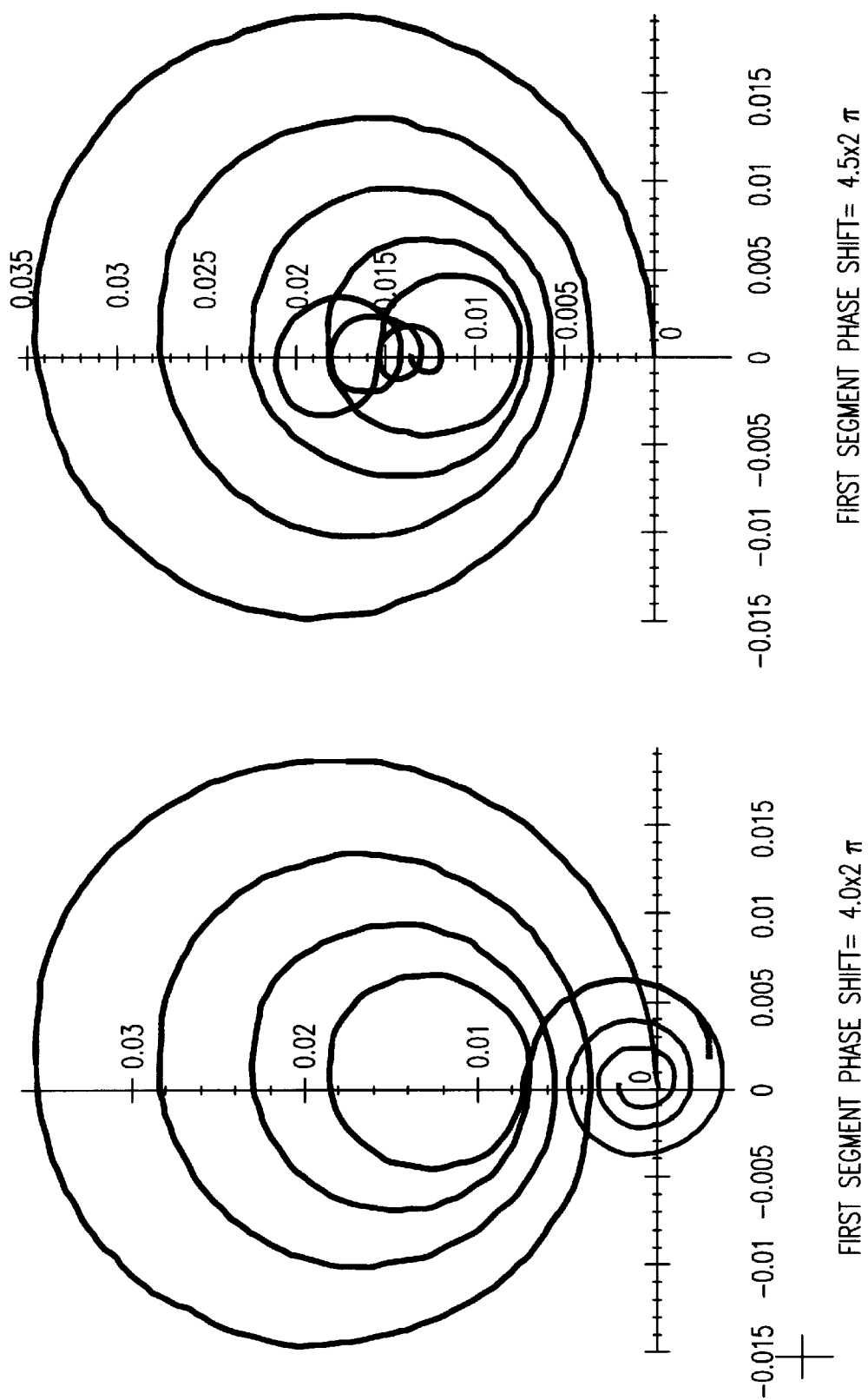
FIG. 5 is a graph showing the real versus imaginary components of the four-wave mixing products for the first segment of cable shown in FIG. 4.
Figure 6:
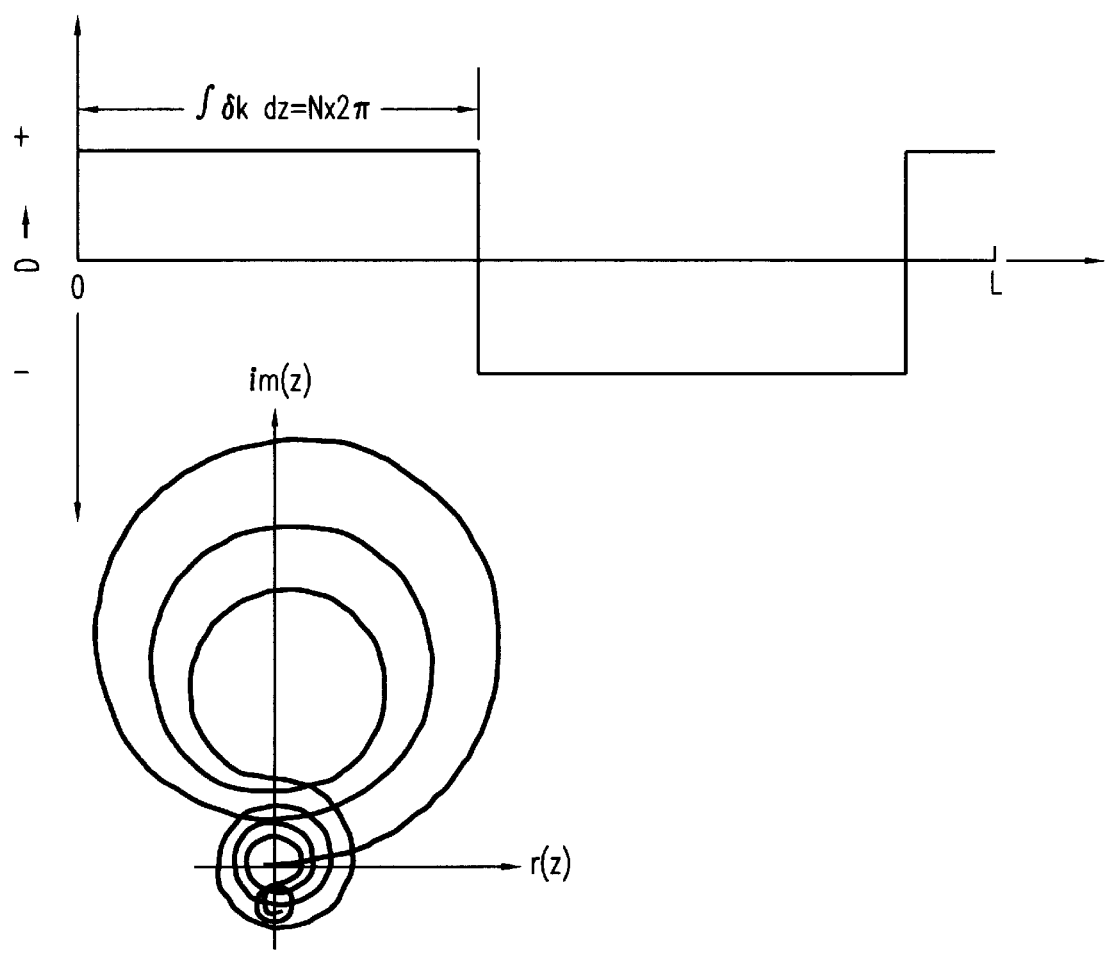
FIG. 6 is a graph showing dispersion versus distance for a specified length of cable having a specified amount of path-average dispersion and fabricated from three segments of fiber optic cable.

FIG. 5 is a graph showing the real versus imaginary components of the four-wave mixing products for the first segment of cable 405 shown in FIG. 4. Real components are shown on the x-axis, and imaginary components are shown on the y-axis. Note that the growth of the four-wave mixing vector is much smaller when the phase shift accumulated over the first segment, mathematically denoted as $$\int \delta k dz$$

is an integer multiple of $2\pi$, or $N*2\pi$, as opposed to $(N+\frac{1}{2})*2\pi$, where N is an integer. This desired condition can be met as follows. When measuring the dispersion of the first and second cable segments using the system of FIG. 1, the difference in wavelength between the first and second lasers 102, 104, respectively, should be set substantially equal to $m*\delta\lambda$, such that $$\lambda_2 - \lambda_1 = m*(\Delta\lambda)$$

where m is also an integer. After the wavelength difference is set to an appropriate value according to the above equation, a first segment of fiber optic cable is cut from a positive-dispersion cable spool at substantially the point where the sinusoidal oscillations in the amplitude of the four-wave mixing products yields $N*m^2$ oscillation cycles. The second segment of fiber optic cable is cut from a negative-dispersion cable spool according to the procedure described above in connection with FIG. 3. A third segment of fiber optic cable is cut from the positive-dispersion cable spool, such that the sum of the lengths of the first, second, and third cable segments yields the specified cable length, $L_S$. The first, second, and third cable segments are then coupled together to form the cable of specified length $L_S$ and specified dispersion $D_S$. FIG. 6 is a graph showing dispersion versus distance for a specified length of cable having a specified amount of path-average dispersion and fabricated from the first, second, and third segments of fiber optic cable.

We claim:

1. A method of constructing a chromatic dispersion map for a first cable segment having positive dispersion and a second cable segment having negative dispersion, the method CHARACTERIZED BY the steps of:
    (a) measuring the integrated dispersion of at least a portion of a first fiber optic cable as a function of cable length to provide a first set of data;
    (b) measuring the integrated dispersion of at least a portion of a second fiber optic cable as a function of cable length to provide a second set of data; and
    (c) reflecting the second set of data about a line representing zero length, and linearly translating the reflected second set of data by length $L_S$ along an axis representing length and by dispersion $D_S$ along an axis representing integrated dispersion, to provide a transformed second set of data.

2. The method of constructing a chromatic dispersion map as set forth in claim 1 further including the step of determining a length coordinate for a point of intersection of the first set of data with the transformed second set of data, the length coordinate representing the length of a first cable segment.

3. The method of constructing a chromatic dispersion map as set forth in claim 2 further including the step of determining the length of a second cable segment by subtracting the length of the first cable segment from a specified cable length.

4. A method of constructing a chromatic dispersion map for a first cable segment having positive dispersion and a second cable segment having negative dispersion, the dispersion map being used to provide a specified length of fiber optic cable ($L_S$) having a specified amount of chromatic dispersion ($D_S$), the method CHARACTERIZED BY determining the lengths of the first and second cable segments by performing the steps of:
    (a) measuring the integrated dispersion of at least a portion of a first fiber optic cable as a function of cable length to provide a first set of data;
    (b) measuring the integrated dispersion of at least a portion of a second fiber optic cable as a function of cable length to provide a second set of data;
    (c) reflecting the second set of data about a line representing zero length, and linearly translating the reflected second set of data by length $L_S$ along an axis representing length and by dispersion $D_S$ along an axis representing integrated dispersion, to provide a transformed second set of data;
    (d) determining a length coordinate for a point of intersection of the first set of data with the transformed second set of data, the length coordinate representing the length of the first cable segment; and
    (e) determining the length of the second cable segment by subtracting the length of the first cable segment from $L_S$.

5. The method of constructing a chromatic dispersion map as set forth in claim 4 wherein the steps of measuring the integrated dispersion of at least a portion of the first fiber optic cable and measuring the integrated dispersion of at least a portion of the second fiber optic cable include the step of measuring a quantity of sinusoidal oscillations that occur in the amplitude of the four-wave mixing products of either the Stokes or anti-Stokes sideband as a function of cable length.

6. The method of constructing a chromatic dispersion map as set forth in claim 5 wherein the step of measuring a quantity of sinusoidal oscillations that occur in the amplitude of the four-wave mixing products of either the Stokes or anti-Stokes sideband as a function of cable length is performed by coupling a first source of electromagnetic energy of wavelength $\lambda_1$ and a second source of electromagnetic energy of wavelength $\lambda_2$ into the first and second fiber optic cables.

7. The method of constructing a chromatic dispersion map as set forth in claim 6 further including the steps of:
    (a) determining the accumulated phase shift of the four-wave mixing products as a function of cable length for the first and second cable segments,
    (b) determining the length of the first and second sections of the first cable segment so as to minimize the accumulated phase shift of the four-wave mixing products over the specified length of cable;
    (c) cutting the first cable segment into a first section and a second section; and
    (d) coupling the second cable segment between the first and second sections.

* * * * *